United States Patent
Mak et al.

[11] Patent Number: 5,277,661
[45] Date of Patent: Jan. 11, 1994

[54] TITANIUM MMC FANSHAFT WITH SUPERALLOY END ATTACHMENT

[75] Inventors: Stephen W. Mak, Fairfield; Heidi J. Stegemiller, Franklin, both of Ohio

[73] Assignee: The United States of America as represented by the Secretary of the Air Force, Washington, D.C.

[21] Appl. No.: 842,932

[22] Filed: Feb. 27, 1992

[51] Int. Cl.$^5$ ............ F16C 3/00; B63H 1/26; B41J 19/32
[52] U.S. Cl. .................... 464/182; 464/183; 464/902; 416/223 R; 416/223 A; 416/204 R; 403/306
[58] Field of Search .......... 464/183, 182, 181, 180, 464/902; 403/393, 388, 179, 404, 306; 416/204; 285/330, 331, 440

[56] References Cited

U.S. PATENT DOCUMENTS

| | | |
|---|---|---|
| 679,399 | 7/1901 | Smith et al. ............ 285/404 |
| 3,514,132 | 5/1970 | Peabody .................. 285/404 |
| 3,532,439 | 10/1970 | Palfreyman et al. ...... 416/213 |
| 3,600,010 | 8/1971 | Downs .................... 403/306 |
| 3,679,324 | 7/1972 | Stargardter ............. 416/229 |
| 3,826,592 | 7/1974 | Raboin ................... 416/222 |
| 3,863,959 | 2/1975 | Blaschke ................ 285/330 |
| 4,000,956 | 1/1977 | Carlson et al. .......... 416/230 |
| 4,209,334 | 6/1980 | Panzera .................. 106/54 |
| 4,767,233 | 8/1988 | Erickson ................. 403/318 |
| 4,834,616 | 5/1989 | Kasarasky et al. ....... 416/229 R |
| 4,865,356 | 9/1989 | Moore et al. ............ 285/404 |

FOREIGN PATENT DOCUMENTS

| | | |
|---|---|---|
| 147959 | 12/1950 | Australia ............... 286/331 |
| 719613 | 10/1965 | Canada .................. 285/331 |
| 257922 | 11/1969 | U.S.S.R. ................ 464/182 |

Primary Examiner—Clifford D. Crowder
Assistant Examiner—Bibhu Mohanty
Attorney, Agent, or Firm—Donald J. Singer; Robert L. Nathans

[57] ABSTRACT

A first hollow titanium MMC driveshaft portion is diffusion bonded to a third portion which in turn is fastened to a second superalloy portion via circumferentially positioned pins which are tightly fitted within aligned holed formed in the second and third driveshaft portions. The first, second and third portions are concentric with respect to the driveshaft centerline, and the pins are retained by means of a concentric retaining cylinder.

3 Claims, 1 Drawing Sheet

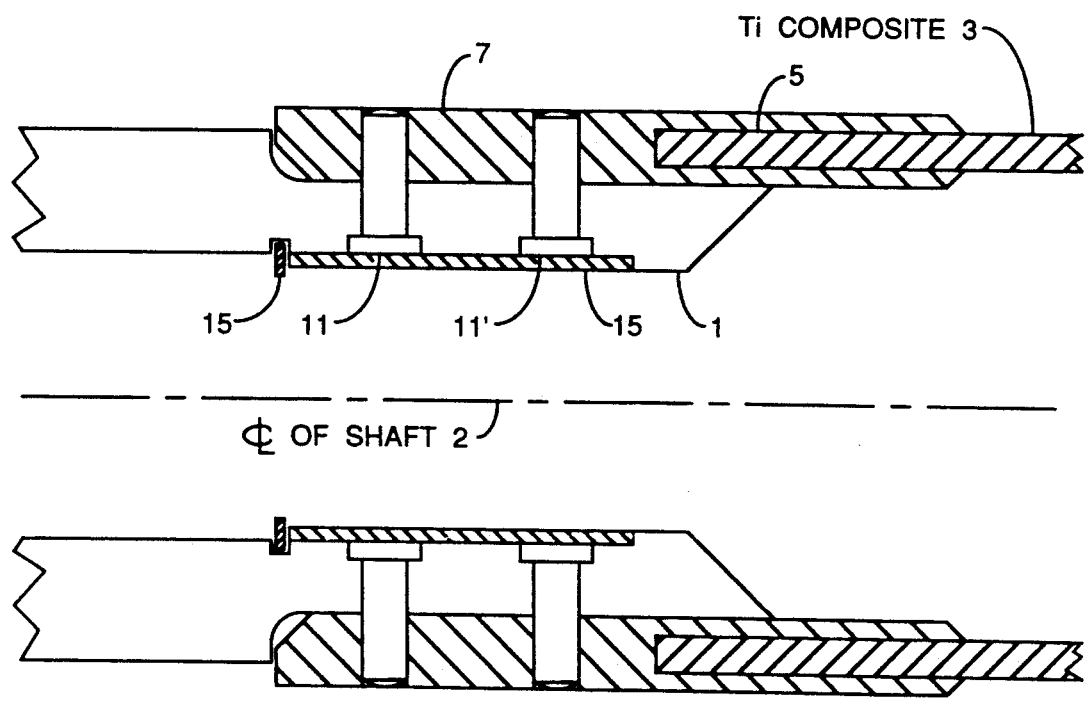

TITANIUM MMC FANSHAFT WITH SUPERALLOY END ATTACHMENT

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of driveshafts and more particularly to driveshafts particularly useful in gas turbine engines.

Traditional fan shaft materials used in gas turbine engines are high strength steel and nickel-based superalloy which includes a spline and a thread in the forward end to hold a fan disk. It is desirable to employ a titanium metal matrix composite (MMC) fan shaft material due to its low density, high strength and high specific stiffness. However, this material cannot be threaded, turned or drilled due to fiber breakage and subsequent loss of load carrying capability or delamination. Joining of a superalloy end attachment to the MMC fanshaft becomes a major issue, particularly at temperatures above 800 degrees F, as brazing, diffusion bonding or inertia welding creates an unacceptably brittle intermetallic layer between the titanium composite and the superalloy shaft portion.

BRIEF SUMMARY OF THE INVENTION

In accordance with a preferred embodiment of the present invention, the titanium MMC hollow portion is diffusion bonded to a monolithic titanium shaft portion and the superalloy shaft portion is tightly fitted to the inside diameter of the monolithic titanium end. Holes are match drilled and reamed, and dowel pins are used to couple the monolithic titanium portion and the superalloy portion together.

The advantages of the present invention include providing a sound mechanical joint between the titanium MMC portion and the superalloy end attachment, avoiding the formation of a brittle intermetallic layer in the joint, avoiding separation of the joint at operating temperatures that put the superalloy in compression and the titanium in tension, avoiding thermal fatigue of the joint, and whereby the end attachment can be easily replaced if worn out.

BRIEF DESCRIPTION OF THE DRAWING

Other objects, features and advantages of the invention will become apparent upon study of the following description, taken in conjunction with the sole figure illustrating a sectional view of the hollow driveshaft arrangement of the invention.

DETAILED DESCRIPTION OF A PREFERRED EMBODIMENT OF THE INVENTION

The superalloy portion 1 is coupled to the fan rotor, not shown, whereas the portion 3 is coupled to a turbine, also not shown, which turbine drives the fan rotor via first hollow cylindrical portion 3 made of the titanium MMC material, a third hollow cylindrical portion 7 made of the monolithic titanium, and a second hollow cylindrical superalloy portion 1. These three annular hollow driveshaft portions are concentric with respect to driveshaft centerline 2. Thus, the figure illustrates a sectional view taken through the upper portion and the lower portion of the hollow driveshaft. The lower driveshaft portion is the mirror image of the upper portion as indicated. Recall that the first hollow cylindrical portion 3, made of titanium MMC cannot be fastened directly to the second superalloy portion 1 since it cannot be machined without compromizing the structural integrity of the MMC material. Thus we provide the third hollow cylindrical portion 7 of monolithic titanium which is diffusion bonded to the first titanium MMC portion 3 along interface 5. Aligned holes in cylindrical annular members 7 and 1 are formed and pins 11 and 11' are tightly fitted therein as shown.

The two rows of pins may be circumferencially positioned about the entire circumference of the hollow driveshaft and each row may be circumferentially offset with respect to the other. The pins are retained int he aligned holes by an annular retaining cylinder 13 which contacts the pin heads as shown. Retaining ring 15 may be used to hold retaining cylinder 13 in place. The tight fit between the titanium and the superalloy will carry the bending moment, while the dowel pins will carry the tortional load and the separating load.

Hence, this arrangement eliminates a the undesirable machining of holes and the like in the titanium MMC driveshaft portion.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A hollow gas turbine driveshaft having a centerline comprising:
    (a) a first hollow cylindrical portion concentrically positioned about said centerline and made of a matrix composite;
    (b) a second hollow cylindrical portion concentrically positioned about said centerline;
    (c) a third hollow cylindrical portion positioned between said first and third hollow cylindrical portion and made of a material that is readily bondable to said first hollow cylindrical portion and is bonded thereto;
    (d) a plurality of radially extending pins for transmitting torque between said first and second hollow cylindrical portions and for resisting bending of said driveshaft about said centerline, said radially extending pins being tightly fitted within aligned holes formed in the second and third hollow cylindrical portions, and said pins having head portions abutting inside surface portions of said second hollow cylindrical portion; and
    (e) retaining means adjacent the head portions of said pins for ensuring retention of said pins within said holes.

2. A hollow gas turbine driveshaft having a centerline comprising:
    (a) a first hollow cylindrical portion concentrically positioned about said centerline and made of a matrix composite;
    (b) a second hollow cylindrical portion concentrically positioned about said centerline;
    (c) a third hollow cylindrical portion positioned between said first and third hollow cylindrical portion that is readily bondable to said first hollow cylindrical portion and is bonded thereto;

(d) a plurality of radially extending pins for transmitting torque between said first and second hollow cylindrical portions and for resisting bending of said driveshaft about said centerline, said radially extending pins being tightly fitted within aligned holes formed in the second and third hollow cylindrical portions, and said pins having head portions abutting inside surface portions of said second hollow cylindrical portion; and (e) a retaining ring concentric with said centerline and in contact with the head portions of said pins for ensuring retention o said pins within said holes.

3. A hollow gas turbine driveshaft having a centerline comprising:

(a) a first hollow cylindrical portion concentrically positioned about said centerline and made of a titanium metal matrix composite;

(b) a second hollow cylindrical portion concentrically positioned about said centerline and made of a superalloy;

(c) a third hollow cylindrical portion positioned between said first and third hollow cylindrical portion and made of monolithic titanium that is readily bondable to said first hollow cylindrical portion and is diffusion bonded thereto; and (d) a plurality of radially extending pins for transmitting torque between said first and second hollow cylindrical portions and for resisting bending of said driveshaft about said centerline due to the weight of said second hollow cylindrical portion, said radially extending pins being tightly fitted within aligned holes formed in the second and third hollow cylindrical portions, and said pins having head portions abutting inside surface portions of said second hollow cylindrical portion; and (e) a retaining ring concentric with said centerline and in contact with the head portions of said pins for ensuring retention of said pins within said holes.

* * * * *